(12) United States Patent
Aiba et al.

(10) Patent No.: US 9,386,197 B2
(45) Date of Patent: Jul. 5, 2016

(54) LENS DEVICE AND IMAGING APPARATUS

(71) Applicant: FUJIFILM Corporation, Tokyo (JP)

(72) Inventors: Daigo Aiba, Saitama (JP); Atsushi Misawa, Saitama (JP); Hiroshi Nakamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 13 days.

(21) Appl. No.: 14/604,780

(22) Filed: Jan. 26, 2015

(65) Prior Publication Data

US 2015/0138435 A1    May 21, 2015

Related U.S. Application Data

(63) Continuation of application No. PCT/JP2013/071768, filed on Aug. 12, 2013.

(30) Foreign Application Priority Data

Sep. 26, 2012  (JP) .................. 2012-212503

(51) Int. Cl.
*H04N 5/225*  (2006.01)
*G03B 17/00*  (2006.01)
*G03B 13/36*  (2006.01)
(Continued)

(52) U.S. Cl.
CPC ............. *H04N 5/2252* (2013.01); *G03B 13/36* (2013.01); *H04N 5/2254* (2013.01); *G03B 17/14* (2013.01); *G03B 2217/002* (2013.01); *H04N 5/23209* (2013.01)

(58) Field of Classification Search
CPC .. G03B 13/36; G03B 17/14; G03B 2217/002; H04N 5/2252; H04N 5/23209
See application file for complete search history.

(56) References Cited

U.S. PATENT DOCUMENTS

| 6,707,619 B1 * | 3/2004 | Okuno | G08B 13/19632 |
| | | | 348/E7.085 |
| 7,050,041 B1 * | 5/2006 | Smith | G06F 3/0312 |
| | | | 345/156 |

(Continued)

FOREIGN PATENT DOCUMENTS

| JP | 09-200586 | 7/1997 |
| JP | 2008-112678 | 5/2008 |

OTHER PUBLICATIONS

International Search Report PCT/JP2013/071768 dated Nov. 19, 2013.

(Continued)

*Primary Examiner* — Aung S Moe
*Assistant Examiner* — John H Morehead, III
(74) *Attorney, Agent, or Firm* — Young & Thompson

(57) ABSTRACT

An object is to provide a lens device that can share a cable and can prevent the unnecessary exposure of the cable, and an imaging apparatus that includes the lens device. A lens device according to an embodiment of the invention, includes a lens barrel, a control unit that is provided on the lens barrel so as to protrude, a cable of which one end is mounted on the control unit and the other end is connected to the imaging apparatus main body, a plurality of length regulating members that are provided, in a longitudinal direction of the cable, and a housing portion in which the cable is housed and which is provided with an opening through which the cable is led out. Any one of the plurality of length regulating members is fitted to the opening, so that a lead-out length of the cable is changed.

20 Claims, 11 Drawing Sheets

(51) Int. Cl.
  *G03B 17/14* (2006.01)
  *H04N 5/232* (2006.01)

(56) References Cited

U.S. PATENT DOCUMENTS 8,870,392 B2 * 10/2014 Kleinert ................ G03B 21/14
                                                      345/22

2015/0124342 A1 * 5/2015 Aiba ...................... G03B 17/14
                                                      359/830
2015/0153542 A1 * 6/2015 Aiba .................... H04N 5/2254
                                                      348/335

OTHER PUBLICATIONS

Written Opinion of the International Searching Authority PCT/JP2013/071768 dated Nov. 19, 2013.

* cited by examiner

LENS DEVICE AND IMAGING APPARATUS

CROSS-REFERENCE TO RELATED APPLICATIONS

This application is a Continuation of PCT International Application No. PCT/JP2013/071768 filed on Aug. 12, 2013, which claims priority under 35 U.S.C §119(a) to Japanese Patent Application No. 2012-212503 filed on Sep. 26, 2012. Each of the above applications is hereby expressly incorporated by reference, in its entirety, into the present application.

BACKGROUND OF THE INVENTION

1. Field of the Invention

The present invention relates to a lens device that is replaceably mounted on an imaging apparatus and an imaging apparatus on which the lens device is mounted, and more particularly, to a technique that allows a cable of the lens device to be housed.

2. Description of the Related Art

It is preferable that a lens device replaceably mounted on an imaging apparatus main body can cope with various kinds of imaging apparatus main bodies. However, there is a lens device including a cable that is provided between the lens device and the imaging apparatus main body and is used to send and receive a signal for the control of a focus, a zoom, an iris, or the like. When this type of a lens device is to be mounted on various kinds of imaging apparatus main bodies, there is a case in which the connection position of a cable varies according to the structure of the imaging apparatus main body. That is, there is a case in which the required length of a cable varies according to the structure of imaging apparatuses.

A case in which a lens device having a long cable and a lens device having a short cable are produced according to the structure of the imaging apparatus main body is considered to deal with these situations. However, since a dedicated cable is required for each model in this case, costs or inventories are increased. Further, a case in which the case of a short cable is dealt with only the lens device having a long cable is also considered. However, if the exposure or slack of a cable occurs much in an imaging apparatus such as a monitoring camera, there is a concern that the cable may be broken due to trouble and appearance is also not good. For this reason, it is preferable that the exposure of the cable be as little as possible.

Considering these points, for example, JP1997-200586A (JP-H09-200586A) discloses a monitoring camera in which the lead-out position of a cable is devised and a cover is provided at a connection portion. Furthermore, in JP2008-112678A, a mechanism for winding a cable is provided on an imaging apparatus main body so that the slack of a cable does not occur.

SUMMARY OF THE INVENTION

However, the related art disclosed in JP1997-200586A (JP-H09-200586A) and JP2008-112678A could not sufficiently deal with a request for the cable of the lens device that is caused by the structure of the imaging apparatus main body. For example, in the technique disclosed in JP1997-200586A (JP-H09-200586A), a plurality of lens devices having different cable lengths need to be prepared according to the structure of the imaging apparatus main body, and the exposure of the cables occurs for a long time when the lens devices are provided with long cables so as to correspond to a plurality of imaging apparatuses. Meanwhile, since the imaging apparatus main body is provided with a cable winding structure in the technique disclosed in JP2008-112678A, there is a problem in that the structure of the cable connection portion (a connector) of the lens device is restricted and only an imaging apparatus main body having such a specific structure can be combined and used.

The invention has been made in consideration of these circumstances, and an object of the invention is to provide a lens device that can share a cable and can prevent the unnecessary exposure of the cable. Further, an object of the invention is to provide an imaging apparatus including the lens device.

In order to achieve the above-mentioned object, according to a first aspect of the invention, there is provided a lens device that is replaceably mounted on an imaging apparatus main body. The lens device includes a lens barrel, a control unit that is provided on the lens barrel so as to protrude, a cable of which one end is mounted on the control unit and the other end is connected to the imaging apparatus main body, a plurality of length regulating members that are provided in a longitudinal direction of the cable, and a housing portion in which the cable is housed and which is provided with an opening through which the cable is led out. The cable is housed in the housing portion in a plane that is parallel to a protruding direction of the control unit and parallel to an optical axis of the lens barrel, and any one of the plurality of length regulating members is fitted to the opening, so that a lead-out length of the cable is changed.

Since the cable is housed in the housing portion in the first aspect, it is possible to change the lead-out length of the cable by adjusting the length of a housed portion of the cable. Accordingly, it is also possible to deal with cases in which the required length of the cable varies according to the structure of the imaging apparatus, by reducing the length of the housed portion of the cable when the lead-out length of the cable is long, conversely, by increasing the length of the housed portion of the cable when the lead-out length of the cable is short. Therefore, it is possible to appropriately use a short cable and a long cable regardless of plural kinds of cables, so that it is possible to share a cable. Further, since it is possible to adjust the lead-out length of the cable by changing the length of the housed portion of the cable, it is possible to prevent the unnecessary exposure of the cable and to prevent trouble while ensuring good appearance.

In regard to the form of the cable housed in the housing portion in the first aspect, the cable may be housed so as to be wound in a circular shape, a quadrangular shape, a spiral shape, or the like and the cable may be housed so as to meander or be folded back. Here, the length of a wound portion, a meandering portion, or a folded portion of the cable, the number of times of the winding, meandering, and folding of the cable, and the like may be determined according to the lead-out length of the cable.

Meanwhile, the "control unit" of the first aspect includes control units that control a zoom lens, a focus lens, an iris and the like included in the lens device. These control units may include, for example, a motor and a galvanometer. Further, since the plurality of "length regulating members" are provided in the longitudinal direction of the cable in the first aspect, it is possible to deal with a plurality of lead-out lengths. The number of the length regulating members may be two, and may be three or more.

According to a second aspect of the invention, in the lens device according to the first aspect, the housing portion is provided in a space that is formed around the control unit due to a difference between a diameter of the lens barrel and a size of the control unit. In the second aspect, the housing portion is provided and the cable is wound and housed by using dead space that is formed around the control unit. Accordingly, it is possible to reduce the size of the lens device by a difference between the diameter of the lens barrel and the size of the control unit.

According to a third aspect of the invention, in the lens device according to the first or second aspect, the length regulating member that is closest to a base end portion among the plurality of length regulating members does not pass through the opening even though the cable is pulled, and the length regulating members except for the length regulating member, which is closest to the base end portion, are elastically deformed and pass through the opening when the cable is pulled by a force equal to or greater than a predetermined force. For the change of the lead-out length of the cable, a winding length may be changed after the removal of the cover for the housing portion. However, it is possible to easily adjust the lead-out length of the cable by changing the lead-out length of the cable through the pull of the cable as in the third aspect. Further, since the length regulating members are elastically deformed and pass through the opening in the third aspect, the length regulating members are restored to the original shapes after passing through the opening. Meanwhile, it is preferable that the shapes or sizes of the opening and the length regulating member or the material of the length regulating member be determined so that the "predetermined force" of the third aspect does not have an excessively large value or an excessively small value.

According to a fourth aspect of the invention, in the lens device according to the third aspect, the length regulating member, which is provided closest to the base end portion, includes a stopper that cannot pass through the opening and is provided at the base end portion of the cable, the length regulating members except for the length regulating member, which is provided closest to the base end portion, include tapered portions which are thrilled of elastic members and of which diameters are increased from a tip portion of the cable toward the base end portion, and the maximum diameter of the tapered portion is larger than the diameter of the opening. Since the length regulating members except for the length regulating member, which is closest to the base end portion, includes the tapered portions having the above-mentioned form in the fourth aspect, it is possible to easily adjust the lead-out length of the cable by pulling the cable with the "force equal to or greater than a predetermined force" described above in the third aspect while preventing the change of the lead-out length of the cable, which is caused when the length regulating members pass through the opening, in a usual state. Further, since the maximum diameter of the tapered portion is larger than the diameter of the opening and the length regulating members are elastically deformed and pass through the opening as described above in the third aspect, the length regulating members are restored to the original shapes after passing through the opening. Accordingly, it is possible to prevent the cable from being pulled in a reverse direction (in a direction in which the lead-out length of the cable is reduced). Furthermore, since the length regulating member, which is closest to the base end portion, includes a stopper that cannot pass through the opening in the fourth aspect, the longest lead-out length of the cable is restricted. Accordingly, it is possible to prevent the cable or the control unit from being damaged by the excessive lead out of the cable.

According to a fifth aspect of the invention, in the lens device according to any one of the first to fourth aspects, the opening is provided so that the cable is led out in a direction opposite to a direction of a visual line of the lens device. The fifth aspect is to define an aspect of the lead-out direction of the cable, and it is possible to suppress the exposure length of the cable by leading out the cable in the direction opposite to the direction of a visual line of the lens device, that is, toward the imaging apparatus main body. In this case, it is preferable that the interference between the imaging apparatus main body and the cable be considered.

According to a sixth aspect of the invention, in the lens device according to any one of the first to fourth aspects, the opening is provided so that the cable is led out in the protruding direction of the control unit. The sixth aspect is to define another aspect of the lead-out direction of the cable, and it is possible to suppress the exposure length of the cable by employing these aspects according to the structure (the size or the shape, or the mounting position of the cable) of the imaging apparatus main body.

According to a seventh aspect of the invention, in the lens device according to any one of the first to sixth aspects, a notch is formed at a marginal portion of a cover that is mounted on the housing portion, and the notch forms the opening when the cover is mounted. It is possible to easily perform the setting of the lead-out length of the cable, which is achieved by fitting the length regulating member to the opening, by employing the structure such as the seventh aspect. Meanwhile, another notch corresponding to the notch may be formed at a main body of the housing portion, and an opening may be formed by these plural notches.

According to an eighth aspect of the invention, in the lens device according to any one of the first to seventh aspects, the lens barrel or the housing portion is provided with a guide member for the cable that is formed in a direction of an optical axis of the lens barrel. In the eighth aspect, it is possible to stably house the cable in the housing portion by the guide member that is formed according to the winding direction of the cable.

According to a ninth aspect of the invention, in the lens device according to any one of the first to eighth aspects, the control unit is an iris control unit and the cable is an iris cable. Since an imaging apparatus, such as a monitoring camera, usually takes an image in a constant direction and at a constant distance, a zoom or a focus is commonly fixed when the imaging apparatus is installed. However, even in such a case, there is a lens device that is provided with an iris control unit to control the iris according to the brightness at an imaging location and the change of the brightness. The ninth aspect is to define the lens device that includes the iris control unit.

In order to achieve the above-mentioned object, according to a tenth aspect of the invention, there is provided an imaging apparatus including the lens device according to any one of the first to ninth aspects and an imaging apparatus main body on which the lens device is mounted. Since the imaging apparatus according to the tenth aspect includes the lens device according to any one of the first to ninth aspects, effects of sharing a cable and preventing the exposure of the cable by the lens devices of these aspects are obtained. According to the lens device and the imaging apparatus of the invention, it is possible to share a cable and to prevent the unnecessary exposure of the cable as described above.

DESCRIPTION OF THE PREFERRED EMBODIMENTS

Embodiment of Lens Device

<Structure of Lens Device>

Figure 1:
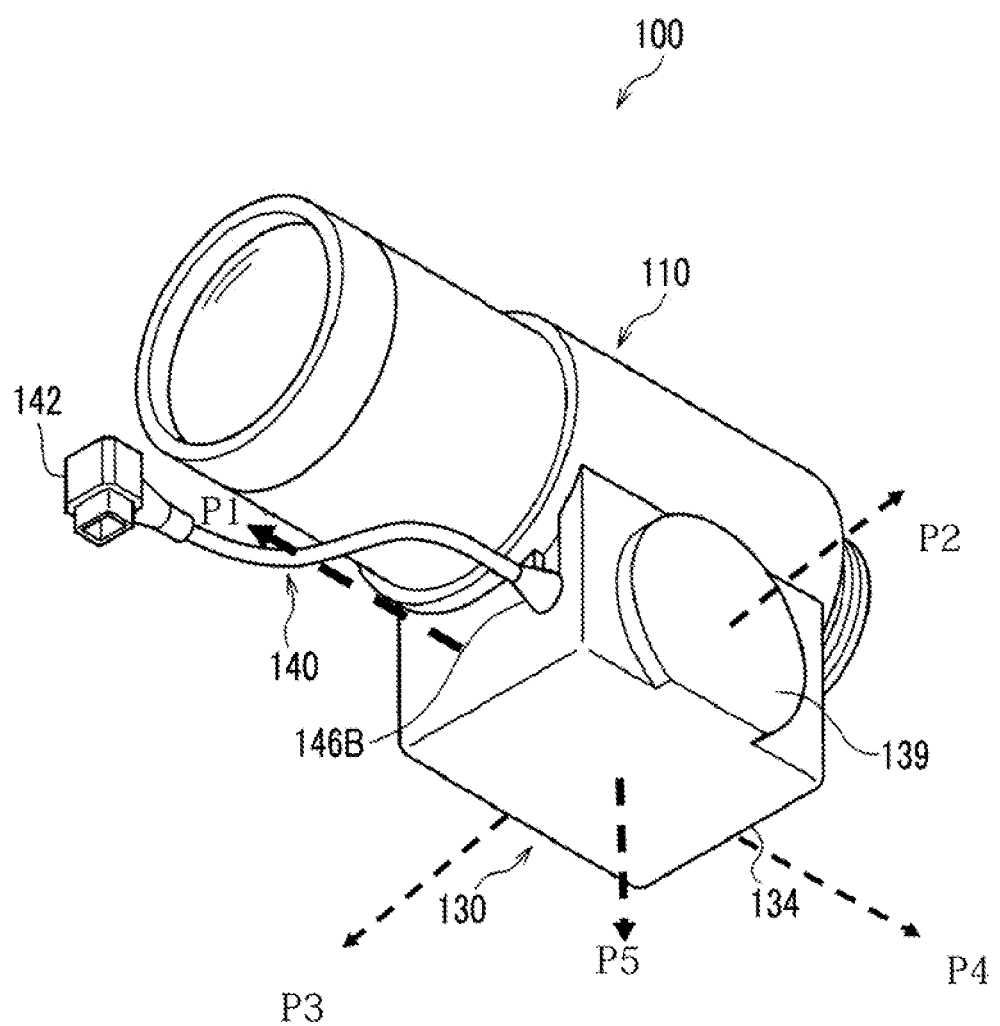
FIG. 1 is a view showing a lens device according to an embodiment of the invention.

An embodiment of a lens device according to the invention will be described in detail below with reference to the accompanying drawing. FIG. 1 is a view showing the appearance of a lens device 100 for a monitoring camera (a lens device) according to an embodiment of the invention. As shown in FIG. 1, the lens device 100 according to this embodiment includes a lens barrel 110, a housing portion 130 (a housing portion), a cover 134 that is mounted on the housing portion 130, and an iris cable 140 (a cable or an iris cable). The lens device 100 is replaceably mounted on a monitoring camera main body (an imaging apparatus main body) as described below, and forms a monitoring camera (an imaging apparatus).

The lens barrel 110 includes an imaging lens, a zoom lens, a focus lens, and an iris not shown) that are provided therein. The focus lens and the zoom lens are moved back and forth in the direction of an optical axis L1 by a mechanism, such as a cam member and a cam groove (not shown). As a result, focusing and zooming are performed.

Figure 2:
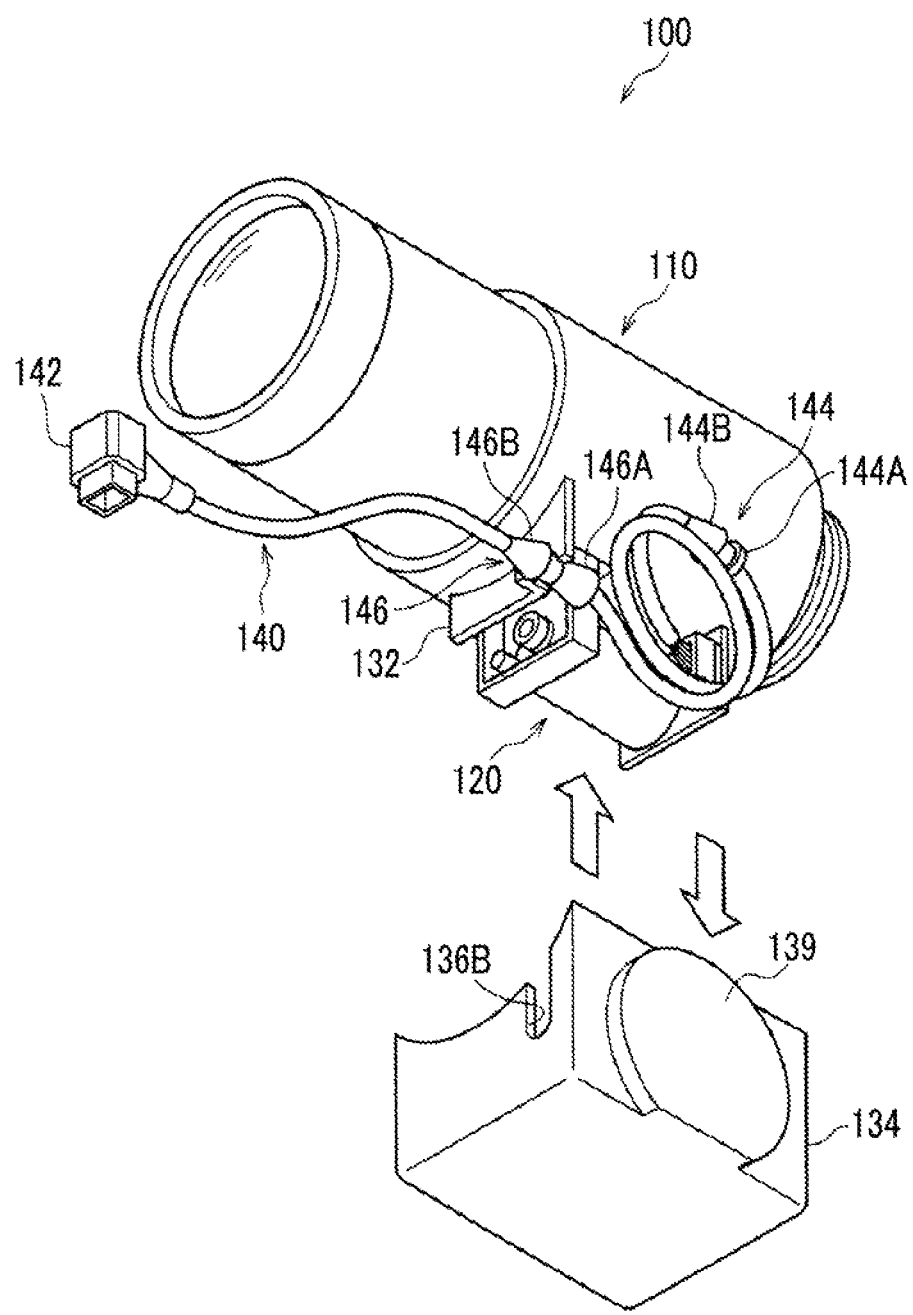
FIG. 2 is a view showing a state in which a cover for a housing portion of the lens device shown in FIG. 1 is mounted.

FIG. 2 is a view showing a state in which the cover 134 is removed. As shown in FIG. 2, an iris meter 120 (a control unit or an iris control unit) is provided on the outer periphery of the lens barrel 110 so as to protrude in a direction L2 orthogonal to the optical axis L1. The iris meter 120 is to drive an iris (not shown). When a connector 142 of the iris cable 140 is connected to the monitoring camera main body (not shown), power and a signal are supplied to the iris meter 120 from the monitoring camera main body. As a result, the iris is driven by the iris meter 120.

Figure 3:
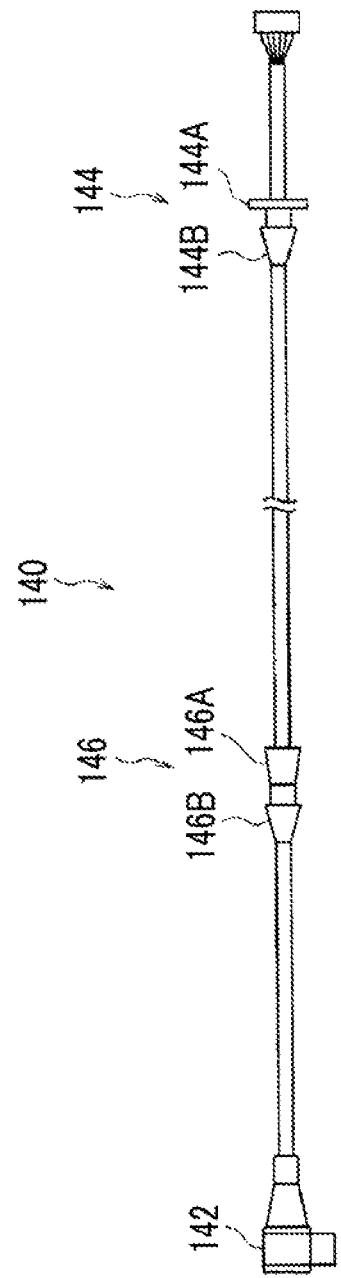
FIG. 3 is a view showing an iris cable of the lens device shown in FIG. 1.
Figure 4:
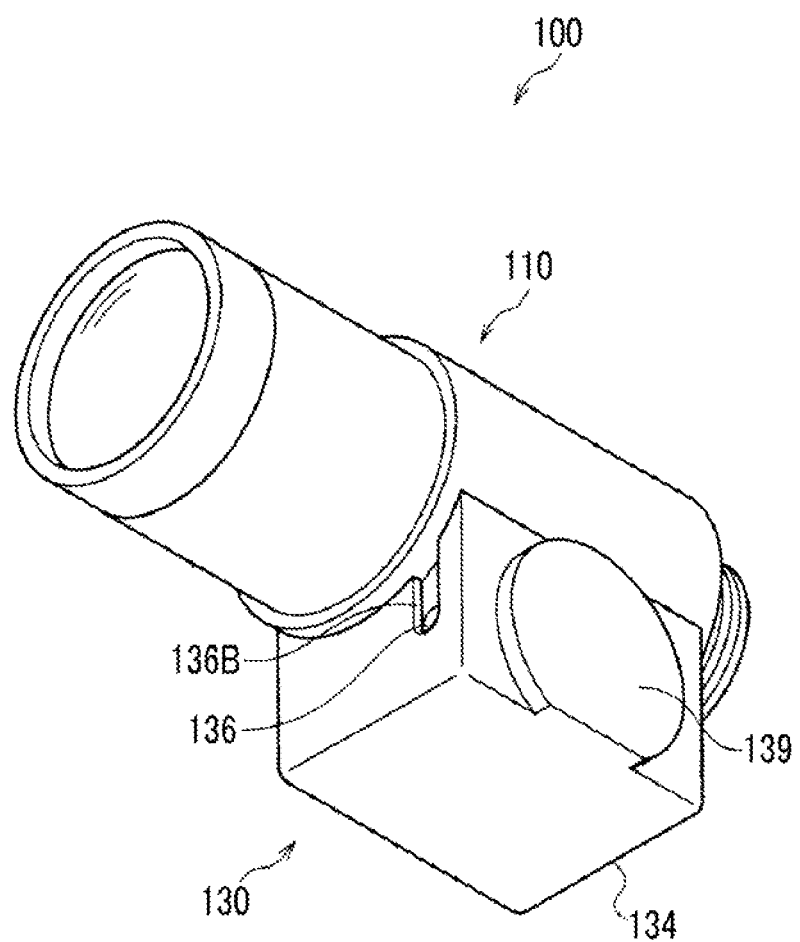
FIG. 4 is a view showing a state in which the cable is omitted in the lens device shown in FIG. 1.

A base end portion of the iris cable 140 is connected to the iris meter 120, the connector 142 is provided at a tip portion of the iris cable 140, and the connector 142 is connected to a connector (not shown) of the monitoring camera main body. Further, cable bushes 144 and 146 (length regulating members) are integrally provided on the iris cable 140 as shown in FIG. 3, and these cable bushes 144 and 146 are adapted to be fitted to an opening 136 (an opening) that is formed at the housing portion 130. As shown in FIGS. 2 to 4, the size of the iris meter 120 in a cross-section taken along the direction of the optical axis of the lens barrel 110 is smaller than the diameter of the lens barrel 110 and the iris cable 140 is wound in a space that is formed due to a difference between the size of the iris meter 120 and the diameter of the lens barrel 110. Accordingly, the size of the lens device 100 is reduced.

The cable bush 144 is provided at the base end portion (a portion close to the iris meter 120) of the iris cable 140, and includes a stopper 144A (a stopper) and a tapered part 144B (a tapered portion). When the cable bush 144 is fitted to the opening 136, the opening 136 is interposed between the stopper 144A and the tapered part 144B and the iris cable 140 can be fixed in a state in which the lead-out length of the iris cable 140 is long. Meanwhile, the cable bush 146 is provided on a middle portion of the iris cable 140 (between the cable bush 144 and the connector 142), and includes tapered parts 146A and 146B (tapered portions). When the cable bush 146 is fitted to the opening 136, the opening 136 is interposed between the tapered parts 146A and 146B and the iris cable 140 can be fixed in a state in which the lead-out length of the iris cable 140 is short. Further, FIGS. 1 and 2 show a state in which the cable bush 146 is fitted to the opening 136 and the lead-out length of the iris cable 140 is reduced.

Meanwhile, the lens device according to the invention may be provided with three or more cable bushes so as to be capable of setting the lead-out length of the iris cable in three stages or more.

The housing portion 130 houses the wound iris cable 140 and protects the iris meter 120. The housing portion 130 includes a plate-like member 132 that is fixed to the lens barrel 110 and the detachable cover 134 (a cover). An inner surface of the cover 134 in the direction of the optical axis L1 comes into contact with the plate-like member 132. Furthermore, as shown in FIGS. 2, 4, 5A, and 5B, semicircular or U-shaped notches 136A and 136B (notches) are formed at positions that face each other on a marginal portion of the plate-like member 132 and a marginal portion of the cover 134, respectively. Accordingly, when the cover 134 is mounted on the plate-like member 132, a circular opening 136 is formed by the notches 136A and 136B. Meanwhile, a protruding portion 139 corresponding to the winding diameter of the iris cable 140 is formed on the side surface of the cover 134, and can stably house the iris cable 140 wound so that the lead-out length of the iris cable is reduced (that is, the iris cable 140 when the length of a wound portion of the iris cable is long and the height of the wound portion of the iris cable is large). However, this protruding portion 139 may not be formed depending on a relationship between the size of the lens barrel 110 and the size of the iris meter 120 and the length of a wound portion of the iris cable 140.

Figure 5A:
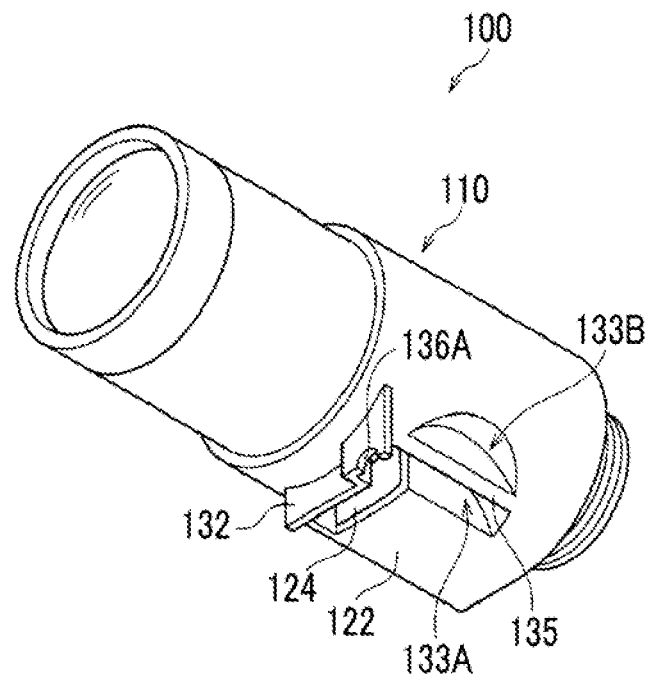
FIGS. 5A and 5B are views showing a lens barrel that is provided with a rib for styling a cable.
Figure 5B:
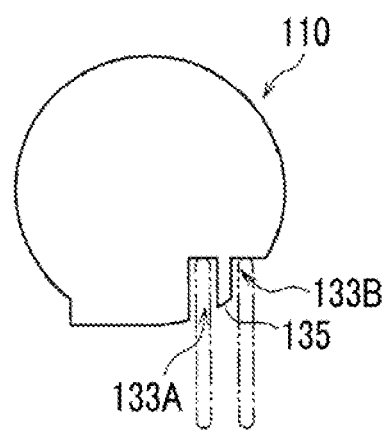

FIGS. 5A and 5B are views showing a structure that houses the wound iris cable 140. As shown in FIGS. 5A and 5B, in the lens device 100 according to this embodiment, a rib 135 is provided on the side of a mounting portion 122 and recesses 133A and 133B corresponding to the thickness of the iris cable 140 are formed by the rib 135. Further, apart of the wound his cable is inserted into the recesses 133A and 133B, so that the position of the iris cable 140 is regulated. Accordingly, the recesses can stably house the iris cable 140 together with the above-mentioned protruding portion 139. A plurality of ribs 135 may be provided depending on the length of a wound portion of the iris cable 140.

Figure 6A:
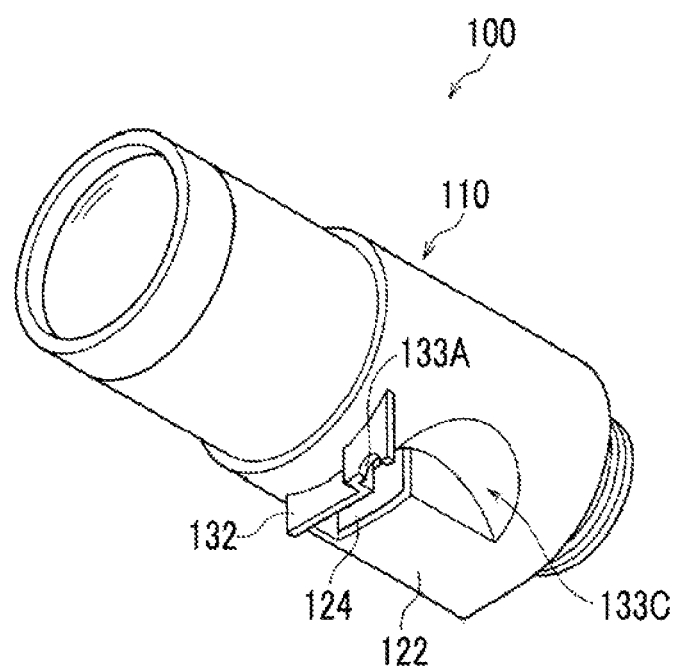
FIGS. 6A and 6B are views showing a lens barrel that is not provided with a rib for styling a cable.
Figure 6B:
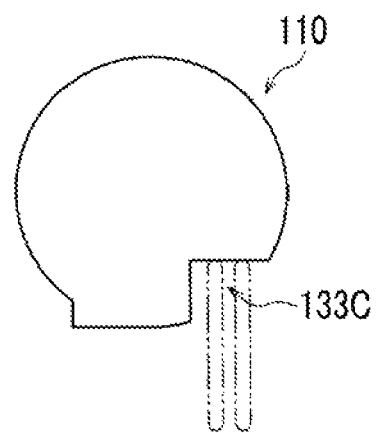

Meanwhile, the embodiment in which the rib 135 is provided has been described with reference to FIGS. 5A and 5B, but a single recess 133C may be formed without the rib 135 as shown in FIGS. 6A and 6B so as to house the iris cable 140.

<Adjustment of Lead-Out Length of Cable>

Next, an example of the adjustment of the lead-out length of the cable in the lens device 100 having the above-mentioned structure will be described. In this example, the iris meter 120 is mounted on the lens barrel 110 by using the mounting portion 122 and a mounting hole 124 after the removal of the cover 134, the iris cable 140 is wound (wound in a space that is formed due to a difference between the size of the iris meter 120 and the size of the lens barrel 110), and the cable bush 144 provided at the base end portion is fitted to the notch 136A of the plate-like member 132. This state is the state shown in FIG. 2. Furthermore, when the cover 134 is mounted on the plate-like member 132 in the state of FIG. 2, the cable bush 144 is fitted to the opening 136 formed by the notches 136A and 136B and the iris cable 140 is fixed in a state in which the lead-out length of the iris cable 140 is short. This state is a state of FIG. 1. In FIG. 1, the tapered part 146B of the cable bush 146 is exposed to the outside of the cover 134 and the tapered part 146A is housed in the cover 134.

Figure 7:
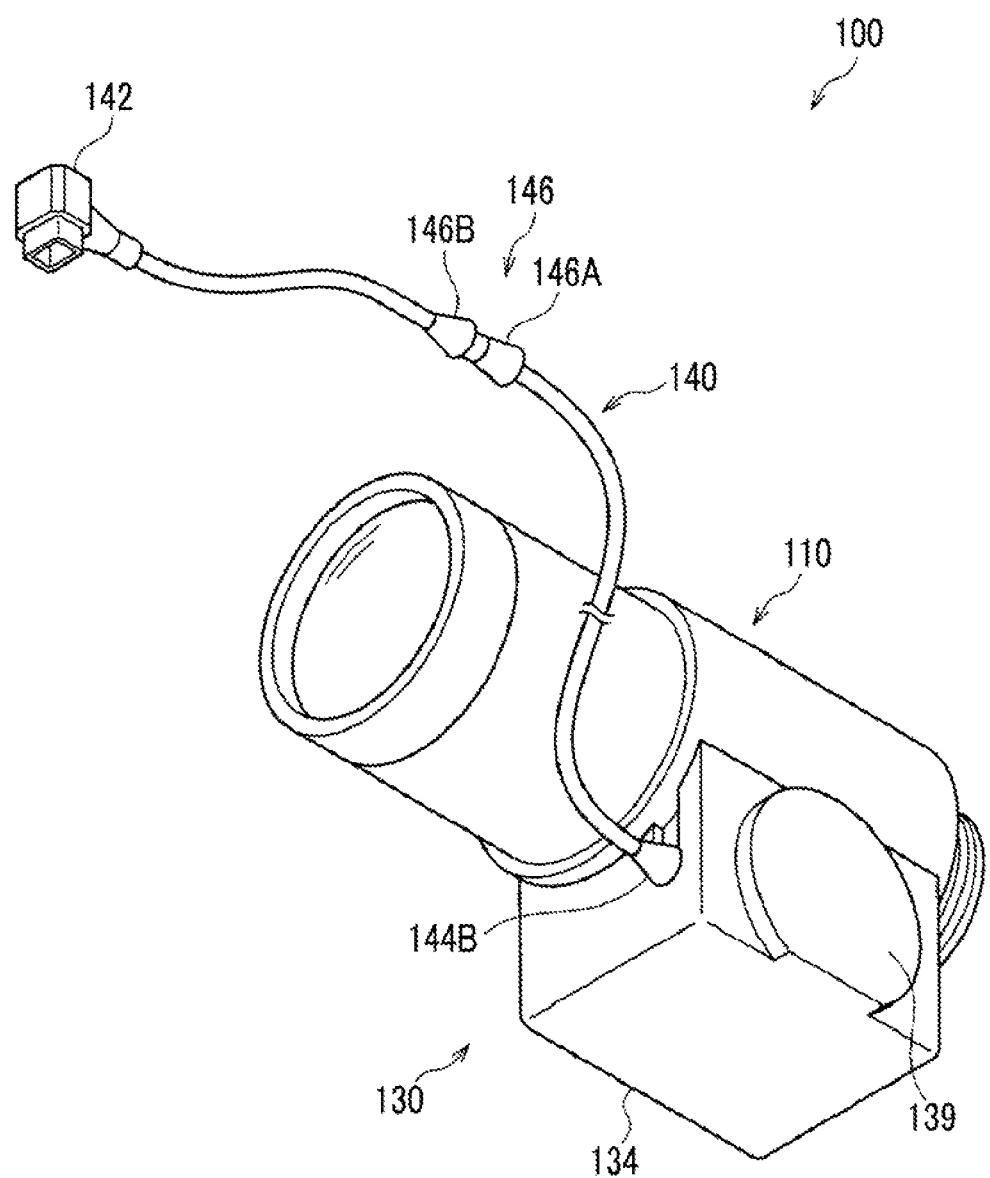
FIG. 7 is a view showing a state in which the cable is led out of the lens device shown in FIG. 1.
Figure 8:
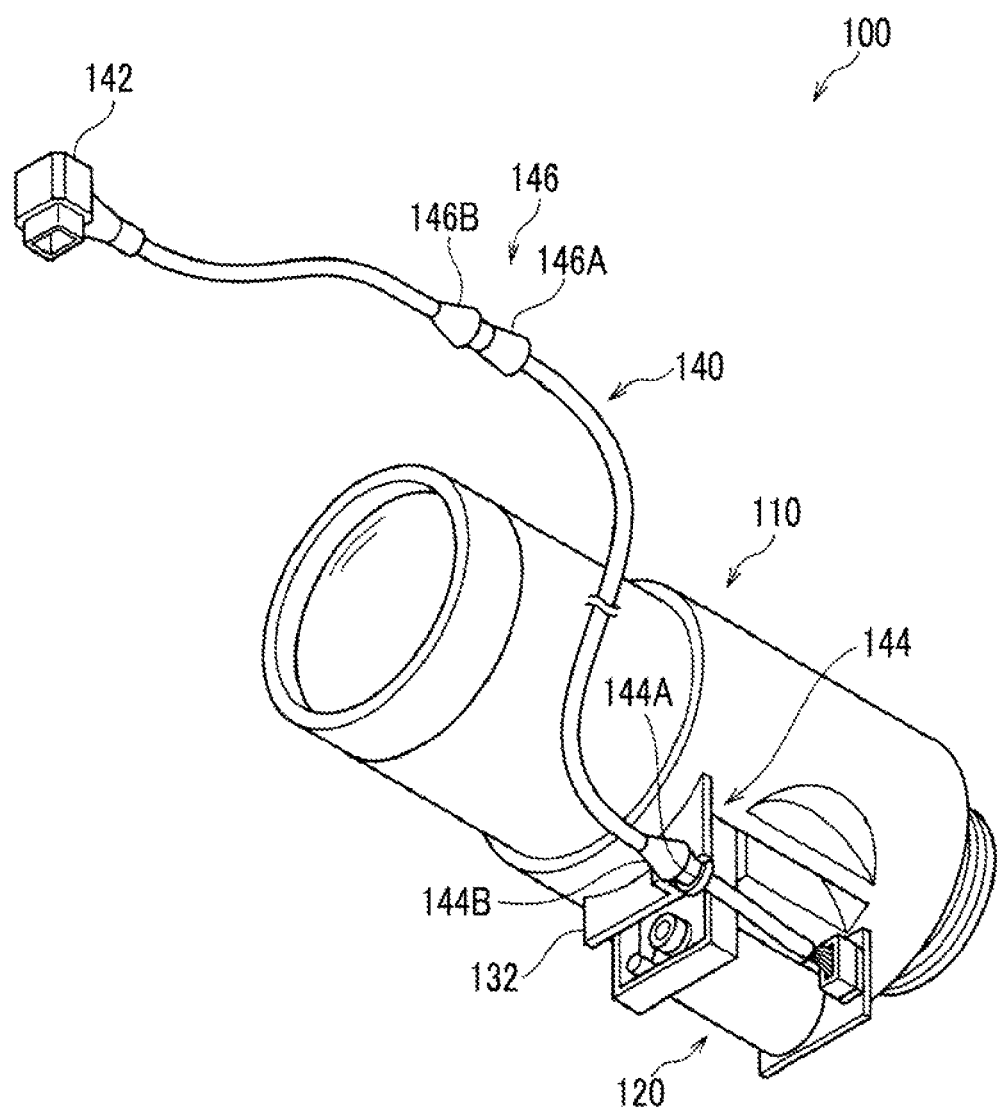
FIG. 8 is a view showing a state in which the cover for the housing portion is removed in the state shown in FIG. 7.

When the lead-out length of the iris cable 140 is to be increased by the structure (the position of the connector or the like) of the monitoring camera main body, the tapered part 146A of the cable bush 146 is elastically deformed and passes through the opening 136 if the iris cable 140 is pulled from the state of FIG. 1 by a force equal to or greater than a predetermined force. When the iris cable 140 is further led out, the tapered part 144B of the cable bush 144 is elastically deformed and passes through the opening 136. However, since the diameter of the stopper 144A is larger than the diameter of the opening 136, the stopper 144A does not pass through the opening 136. Accordingly, the cable hush 144 does not pass through the opening 136 as a whole. That is, the cable bush 144 is fitted to the opening 136 and is fixed in a state in which the lead-out length of the iris cable 140 is long. This state is shown in FIG. 7. Further, a state in which the cover 134 is removed from FIG. 7 is shown in FIG. 8.

Since the lead-out length of the iris cable 140 can be adjusted according to the structure of the monitoring camera main body in the lens device 100 according to the first embodiment as described above, it is possible to share the cable. Further, when the lead-out length of the cable is short, it is possible to suppress the exposure of the iris cable 140 to the outside of the housing portion 130 as much as possible by housing the iris cable 140 so that the length of a portion of the iris cable 140 wound in the housing portion 130 is long.

<Modification>

Next, a modification of the embodiment will be described. In the above-mentioned embodiment, the iris cable 140 has been led out to the front side of the housing portion 130 (in a P1 direction of FIG. 1). However, in the lens device according to the invention, the lead-out direction is not limited thereto, and the iris cable 140 may be led out to an opposite side (in a P2 or P3 direction of FIG. 1) according to the structure of a monitoring camera main body to be assumed and may be led out to the rear side or the lower side (in a P4 or P5 direction of FIG. 1). It is preferable that the lead-out direction be set in consideration of the structure of the monitoring camera main body so that the lead-out length or the exposure length of the iris cable 140 is reduced, and it is preferable that the interference between the monitoring camera main body and the iris cable 140 be considered.

Figure 9:
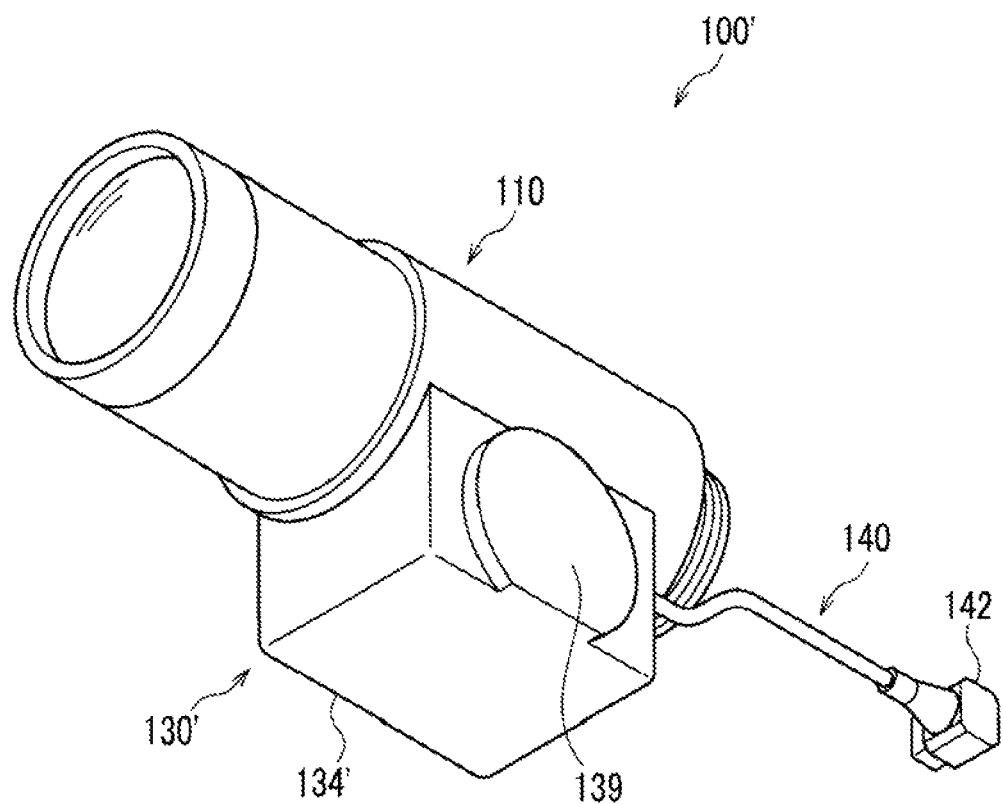
FIG. 9 is a view showing a modification of the lens device according to the invention.

FIG. 9 is a view showing a lens device 100' according to this modification. Meanwhile, in the following description, the same components as the components of FIGS. 1 to 8 will be denoted by common reference numerals and the description thereof will be omitted. The structure of the lens device 100' according to this modification is the same as the structure of the above-mentioned lens device 100 except that an opening is formed at a rear portion of a housing portion 130' (a cover 134') and an iris cable 140 is led out to the rear side. For this reason, even in the lens device 100', it is possible to adjust the length of a wound portion of the iris cable 140 and to lengthen the lead-out length of the iris cable by pulling the iris cable 140 from a state shown in FIG. 9 (a state in which the iris cable 140 is wound in the housing portion 130' and the lead-out length of the iris cable 140 is short) as in the lens device 100. Accordingly, it is possible to share the cable and to suppress the exposure of the iris cable 140. Meanwhile, in FIG. 9, the iris cable 140, which is led out, is formed in the shape of a crank and a connector 142 can be connected to the side surface of the monitoring camera main body. However, the shape of the iris cable 140, which is formed in the shape of a crank, may be changed so that the connector 142 is connected to the bottom of the monitoring camera main body.

Embodiment of Imaging Apparatus

Figure 10A:
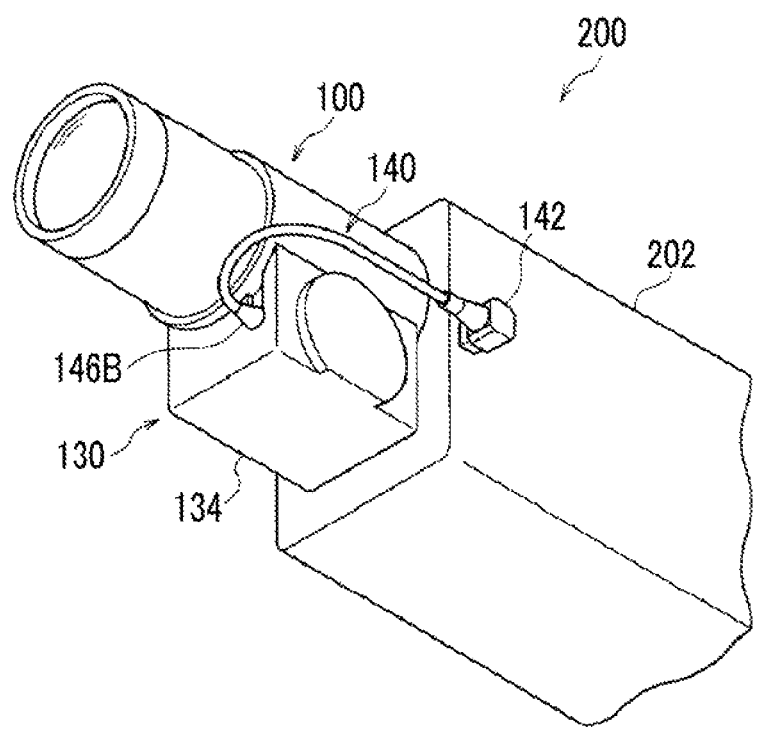
FIGS. 10A and 10B are views showing a monitoring camera that includes the lens device shown in FIG. 1.
Figure 10B:
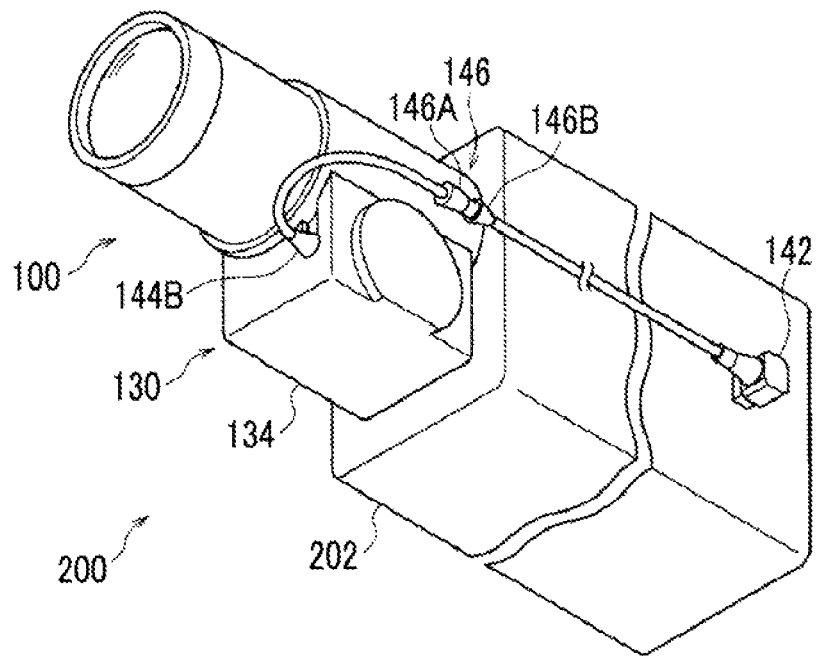

Next, an embodiment of an imaging apparatus according to the invention will be described. FIGS. 10A and 10B are views showing a monitoring camera 200 (an imaging apparatus) that includes the lens device according to the embodiment of the invention, The monitoring camera 200 includes the lens device 100 according to the embodiment of the invention and a monitoring camera main body 202 (an imaging apparatus main body). The monitoring camera main body 202 includes an imaging element CCD, a CMOS, or the like), an image processing circuit, a recording medium, and the like that are not shown. The monitoring camera main body 202 is adapted to be capable of performing the acquisition, recording, and the like of an image. FIG. 10A shows a case in which the lead-out length of an iris cable 140 is short and the connector 112 is connected to the front portion of the monitoring camera main body 202, and corresponds to a case in which the lens device 100 is in the state shown in FIG. 1. Further, FIG. 10B shows a case in which the lead-out length of the iris cable 140 is long and the connector 142 is connected to the rear portion of the monitoring camera main body 202, and corresponds to a case in which the lens device 100 is in the state shown in FIG. 7.

Figure 11:
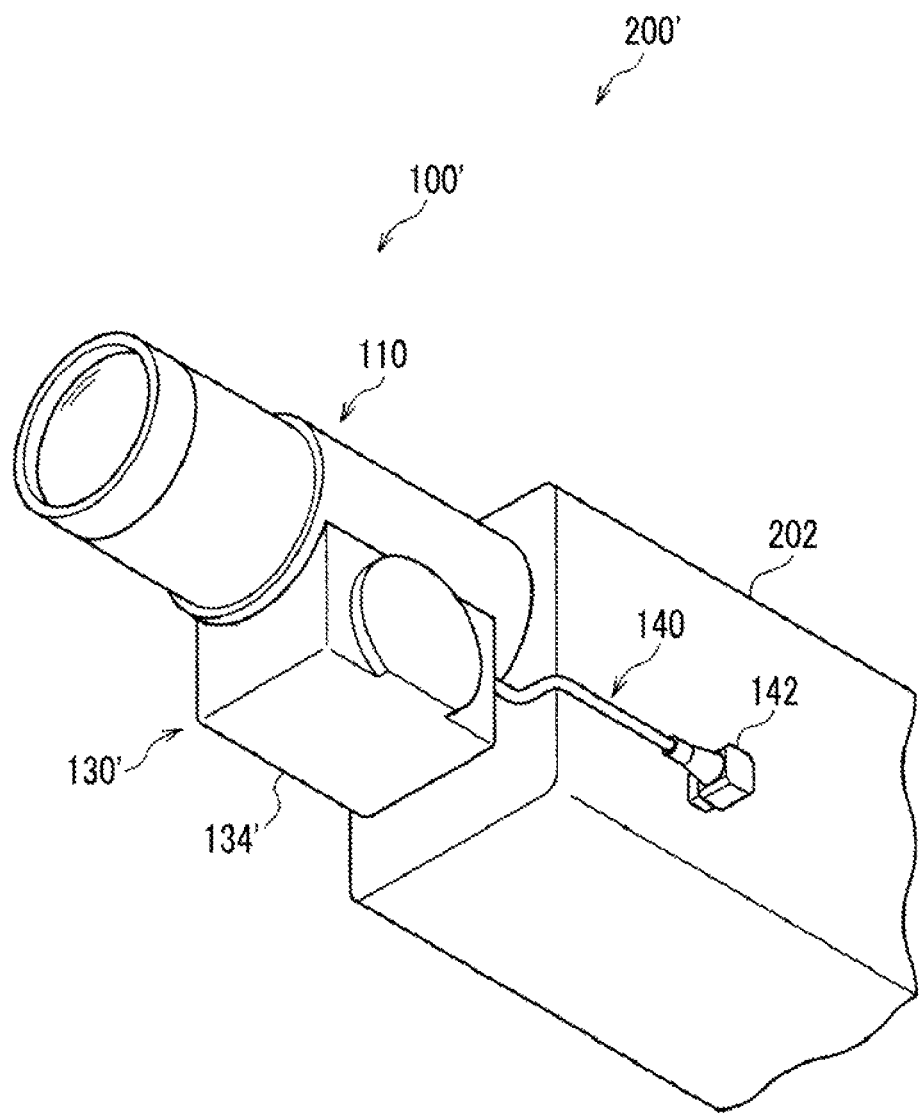
FIG. 11 is a view showing a monitoring camera that includes the lens device shown in FIG. 9.

Furthermore, FIG. 11 is a view showing a monitoring camera 200' that includes the lens device 100' of FIG. 9 as a lens device. Even in this case, as in the monitoring camera 200, it is possible to change the lead-out length of the iris cable 140 and to change the mounting position of the connector 142 according to the structure of the monitoring camera main body 202.

As in the above-mentioned lens device 100, even in the monitoring cameras 200 and 200', it is possible to adjust the lead-out length of the iris cable according to the structure (the position of the connector) of the monitoring camera main body 202 by changing the winding length of the iris cable 140. Accordingly, it is possible to share the cable and to suppress the unnecessary exposure of the cable.

The invention has been described above using the embodiments, but the technical scope of the invention is not limited to the description of the embodiments. It is apparent to those skilled in the art that the embodiments can be modified or improved in various ways. It is apparent from the description of claims that embodiments modified or improved in these ways can also be included in the technical scope of the invention.

It should be noted that procedures of processing of operations, orders, steps, processes, and the like of devices, systems, programs, and methods disclosed in claims, the specification, and drawings be performed in an arbitrary order as long as description is not particularly made using "before", "prior to", or the like and an output of previous processing is not used in subsequent processing. Even though operating flows described in claims, the specification, and the drawings are described using "first", "next", or the like for convenience, it is not meant that the operating flows be necessarily performed in this order.

What is claimed is:

1. A lens device that is replaceably mounted on an imaging apparatus main body, the lens device comprising:
a lens barrel;
a control unit that is provided on the lens barrel so as to protrude;
a cable of which one end is mounted on the control unit and the other end is connected to the imaging apparatus main body;
a plurality of length regulating members that are provided in a longitudinal direction of the cable; and
a housing portion in which the cable is housed and which is provided with an opening through which the cable is led out,
wherein the cable is housed in the housing portion in a plane that is parallel to a protruding direction of the control unit and parallel to an optical axis of the lens barrel, and
any one of the plurality of length regulating members is fitted to the opening, so that a lead-out length of the cable is changed.

2. The lens device according to claim 1,
wherein the housing portion is provided in a space that is formed around the control unit due to a difference between a diameter of the lens barrel and a size of the control unit.

3. The lens device according to claim 1,
wherein the length regulating member that is closest to a base end portion among the plurality of length regulating members does not pass through the opening even though the cable is pulled, and
the length regulating members except for the length regulating member, which is closest to the base end portion, are elastically deformed and pass through the opening when the cable is pulled by a force equal to or greater than a predetermined force.

4. The lens device according to claim 2,
wherein the length regulating member that is closest to a base end portion among the plurality of length regulating members does not pass through the opening even though the cable is pulled, and
the length regulating members except for the length regulating member, which is closest to the base end portion, are elastically deformed and pass through the opening when the cable is pulled by a force equal to or greater than a predetermined force.

5. The lens device according to claim 3,
wherein the length regulating member, which is provided closest to the base end portion, includes a stopper that cannot pass through the opening and is provided at the base end portion of the cable,
the length regulating members except for the length regulating member, which is provided closest to the base end portion, include tapered portions which are formed of elastic members and of which diameters are increased from a tip portion of the cable toward the base end portion, and
the maximum diameter of the tapered portion is larger than the diameter of the opening.

6. The lens device according to claim 4,
wherein the length regulating member, which is provided closest to the base end portion, includes a stopper that cannot pass through the opening and is provided at the base end portion of the cable,
the length regulating members except for the length regulating member, which is provided closest to the base end portion, include tapered portions which are formed of elastic members and of which diameters are increased from a tip portion of the cable toward the base end portion, and
the maximum diameter of the tapered portion is larger than the diameter of the opening.

7. The lens device according to claim 1,
wherein the opening is provided so that the cable is led out in a direction opposite to a direction of a visual line of the lens device.

8. The lens device according to claim 2,
wherein the opening is provided so that the cable is led out in a direction opposite to a direction of a visual line of the lens device.

9. The lens device according to claim 3,
wherein the opening is provided so that the cable is led out in a direction opposite to a direction of a visual line of the lens device.

10. The lens device according to claim 4,
wherein the opening is provided so that the cable is led out in a direction opposite to a direction of a visual line of the lens device.

11. The lens device according to claim 5,
wherein the opening is provided so that the cable is led out in a direction opposite to a direction of a visual line of the lens device.

12. The lens device according to claim 6,
wherein the opening is provided so that the cable is led out in a direction opposite to a direction of a visual line of the lens device.

13. The lens device according to claim 1,
wherein the opening is provided so that the cable is led out in the protruding direction of the control unit.

14. The lens device according to claim 2,
wherein the opening is provided so that the cable is led out in the protruding direction of the control unit.

15. The lens device according to claim 3,
wherein the opening is provided, so that the cable is led out in the protruding direction of the control unit.

16. The lens device according to claim 4,
wherein the opening is provided so that the cable is led out in the protruding direction of the control unit.

17. The lens device according to claim 1,
wherein a notch is formed at a marginal portion of a cover that is mounted on the housing portion, and
the notch forms the opening when the cover is mounted.

18. The lens device according to claim 1,
wherein the lens barrel or the housing portion is provided with a guide member for the cable that is formed in a direction of an optical axis of the lens barrel.

19. The lens device according to claim 1,
wherein the control unit is an iris control unit, and
the cable is an iris cable.

20. An imaging apparatus comprising:
the lens device according to claim 1; and
an imaging apparatus main body on which the lens device is detachably mounted.

* * * * *